July 3, 1923.

J. SCHNEIDER 1,460,506

TIRE CHAIN MOUNTING DEVICE

Filed Jan. 4, 1921

INVENTOR:
Joseph Schneider

BY
*[signature]*
ATTORNEYS.

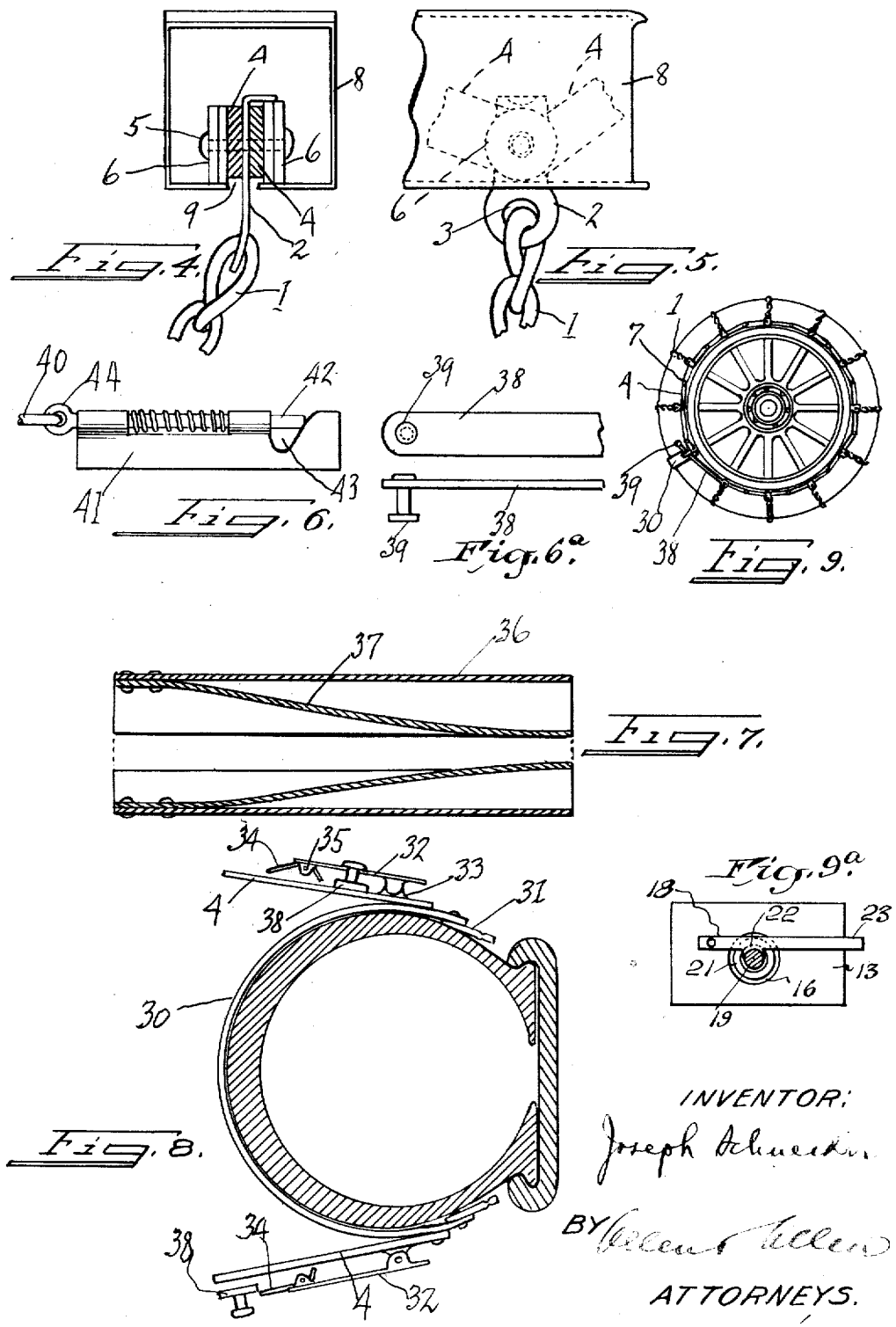

Patented July 3, 1923.

1,460,506

UNITED STATES PATENT OFFICE.

JOSEPH SCHNEIDER, OF CINCINNATI, OHIO.

TIRE-CHAIN-MOUNTING DEVICE.

Application filed January 4, 1921. Serial No. 434,949.

*To all whom it may concern:*

Be it known that I, JOSEPH SCHNEIDER, a citizen of the United States, and a resident of Cincinnati, in the county of Hamilton and State of Ohio, have invented certain new and useful Improvements in Tire-Chain-Mounting Devices, of which the following is a full, clear, and exact description, reference being had to the drawings forming part of this specification.

My invention relates to devices for mounting tire chains on the tires of vehicles, principally motor vehicles.

In my Letters Patent No. 1,346,469 issued July 13, 1920, I have described a structure wherein a certain type of chain having a semi-circular clamp and hinged side links was projected against a tire.

In the present application the chain is of the same type as described in the patent referred to but the projecting device and other details are so modified as to accomplish a complete automatic mounting of a chain on a tire, which operation may be accomplished and the driver proceed with his car without dismounting and adjusting. In dismounting the chain it will be necessary to handle it manually, but this will be done in the garage.

It is thus my object to provide a device which will project a tire chain of the loose cross chain type by entirely automatic operations. The chain may be readily and easily mounted in the advancing device and is simple to set in place.

These objects and other advantages to be noted I accomplish by that certain construction and arrangement of parts to be hereinafter more specifically pointed out and claimed.

In the drawings,

Figure 1 is a top plan view of the device with the lid removed and ready for operation.

Figure 2 is a central vertical section through the device.

Figure 3 is a detail side elevation of the incline for controlling the box spring engaging latch.

Figure 4 is a vertical section through one of the chain mounting holders.

Figure 5 is a side elevational detail of the same parts shown in Figure 4.

Figure 6 is a detail elevation of one of the releasing hooks for the ends of the chain.

Fig. 6ª is an elevation and plan of the chain end member.

Figure 7 is a detail section through one of the fixed chain guides.

Figure 8 is a detail section showing the clamp at the forward end of the chain and one of the terminal links or chain ends in engagement and the other disengaged.

Figure 9 is a side elevation showing the anti-skid chain in place on the tire.

Figure 9ª is a detail elevation of the latch device for the sliding box.

The tire chain is made up of cross chains 1, of the usual type which are hung by means of plates 2, perforated as at 3, to engage over the end links of the cross chains. The plates 2 are secured between side links 4, 4, which are pivoted together and to the plates by means of rivets 5.

The rivets also hold in place washers or buttons 6, which thus project on both sides of the link and plate joint. Intermediate each of the joints or hinge pivots, now described, the links are pivoted together by rivets 7, without any buttons.

The mounting means for setting up the chains, hitherto referred to as chain mounting holders, are long narrow square tubes, 8, having a slot 9 running lengthwise on the lower side thereof. The chains are assembled with the buttons or washers 6, set into the interior of the tubes from the ends, same being too large to drop through the slots. By flexing the intermediate hinges of the side links a compact assembly of the chains in the tubes may be obtained.

The retaining box has sides 10, 10 and a base 11, there being a suitable lid (not shown) and a rear wall 12. Within this box, which is fixedly mounted in any convenient manner beneath the side step of the vehicle (not shown), is a sliding box, having an end wall 13, side walls 14 and a base 15.

The rear wall of the sliding box has a hole 16 therethrough, and a casing 17 extending forwardly therefrom to act as a guard. Pivoted to the said rear wall is a latch 18 which when in normal closed position will lie over a rod 19 held in fixed position in a wall 20 of the container.

Over the rod 19 is a spring 21 which bears against the wall 20, and against the latch on the rod, whereby the spring is held so as to act on the box through said latch. The latch has a curved face 22 where it lies over the rod and has a projecting end 23 which passes through a slot 24 in the sliding box and is engaged by an inclined plate 25 which raises it when the sliding box is in its forward position.

The rod 19 extends through the hole in the sliding box and into the guard therein. A six or seven inch movement is more than sufficient to accomplish the objects of my invention, and the spring 21 serves to project the sliding box. When the box is forward in wheel engaging position, however, the spring is released by the lifting of the latch.

By providing a spring 26, secured to the sliding box and the wall in the container, I am thus able to retract the box after it has been projected, since the projecting movement acts to energize the spring and the release of the main spring leaves the box free to come back.

The forward end of the sliding box is cut in a semi-circle to fit over a tire as at 27, and at the forward corners has small angle plates 28 hinged at 29, with the inwardly projecting leaf thereof provided with a slot.

The chain is formed with a semi-circular spring band 30, at the ends of which are plates 31 which are set into the slots in the plates 28.

As the box is projected this spring band is set over a tire, and as the box is withdrawn the angle plates readily release the ends of the spring band.

The spring band has also mounted on its sides specially devised clips or spring fingers. They are formed of plates 32 which are spring hinged on lugs 33 on the side links 4, pivoted to the band near its ends. The plates carry at their ends small angle plate clips 34 which are spring hinged on lugs 35, so that normally they lie with the inner leaves in abutment with the faces of the side links 4. As will be noted a pressure against the said inner leaves will permit a body to pass the clips 34 inwardly but not outwardly.

The sliding box has fixed guides for the chains, formed of tubes 36, similar to the removable tubes, excepting that springs 37 are placed in the interior of the tubes to press on the buttons of the chains, and hold the side links against rapid withdrawal. The removable tubes are set into the sliding box with their forward ends inserted into the tubes 36 and their rear ends set over posts 37ª mounted in the sliding box.

The terminal side links of the chain are formed of strips 38 of considerable length, which have buttons 39 at their outer ends.

A spring roller 39ª (similar to an ordinary shade roller) is mounted at the rear of the container and two cords 40 wound round it, said cords being brought forwardly and secured to the buttons 39 by spring latch 41.

The latches 41 have spring pins 42 and tapered notches 43 over which the pins extend. The pins 42 have eyes 44 to which the cords 40 are secured, the result of this structure being that when the latches have been snapped over the buttons 39 and the cords have been extended to their full length and the terminal side links are given an additional pull, the pins will be withdrawn from the notches wherein the buttons are engaged, thereby releasing the buttons.

The sliding box has a latch 45 which holds it in position under spring tension, and which will catch into latching position upon withdrawal under influence of the additional retractile spring hitherto noted.

In setting the device, the chain is mounted in the tubes, and the tubes set in place as described. The semi-circular clamp is set up in the front of the sliding box as described, and the latches 41 which are located within the sliding boxes on the ends of the cords 40 are snapped over the buttons on the terminal links.

The entire assembly in the container is positioned as described, so that a projecting of the sliding box will bring it up against the tire. The operator releases the latch 45, in any desired manner which permits the main spring to force the box outwardly from the container and force the spring band of the chain over the tire. The movement of the box is so proportioned as to release the spring controlling latch at the same moment that the spring band of the chain is snapped in place. The retractile spring then draws back the sliding box, the whole operation of clamping the forward end of the chain on the tire being practically instantaneous.

The operator then drives the vehicle slowly forward which draws the chain out through the removable tubes and the fixed tubes. The terminal links are held by the snap latches on the spring roller cords. The cords are of a length to permit the terminal links to be pulled a considerable distance out of the box before the latches release, and by this time the terminal links will have assumed a position tangential to the rim of the wheel, and will have been caught by the latches on the spring band of the chain.

In placing the main spring under tension the operator needs merely push the sliding box to its outermost position and draw the spring back manually for about an inch. This will permit the spring engaging latch to fall in place and the box may be forced back to latching position with the main spring under tension, ready for another operation.

It is believed that the structure and operation of a device embodying the features of my invention have now been described. I do not wish to be limited by the reference to details, where the claims that follow would bear a more general construction.

Having thus described my invention, what I claim as new and desire to secure by Letters Patent, is:—

1. In a device of the character described the combination with a chain having a clamping element for engaging over a tire, of a container, and a slidable member therein for moving the chain, a rod on which the slidable member moves and a spring on the rod, a latch in the slidable member adapted to rest on the rod and a spring to retract the slidable member, and automatic means for lifting the latch from the rod in the outer position of the sliding member.

2. In a device of the character described, a chain for engaging over a tire, a fixed element and a movable element, means on the movable element to engage the chain, a spring means for projecting the movable element, and automatic means for releasing the spring member from its action upon the forward projection of the movable element.

3. In a device of the character described, a device for projecting one end of a chain into engaging relation with a tire, latches on the one end of the chain and terminal links on the other end adapted to engage behind said latches and extendable members adapted to retain the terminal links, and release them when in engaged position behind the latches.

4. In a device of the character described, a device for projecting one end of a chain into engaging relation with a tire, latches on the one end of the chain and terminal links on the other end adapted to engage behind said latches and extendable members adapted to retain the terminal links, and release them when in engaged position behind the latches, said means comprising cords, a spring roller for mounting them and releasing latches on the cords for engaging the terminal links.

JOSEPH SCHNEIDER.